Sept. 17, 1935.  H. W. TURNEY  2,014,402
ELECTROLYTE LEVEL INDICATOR
Filed April 20, 1932
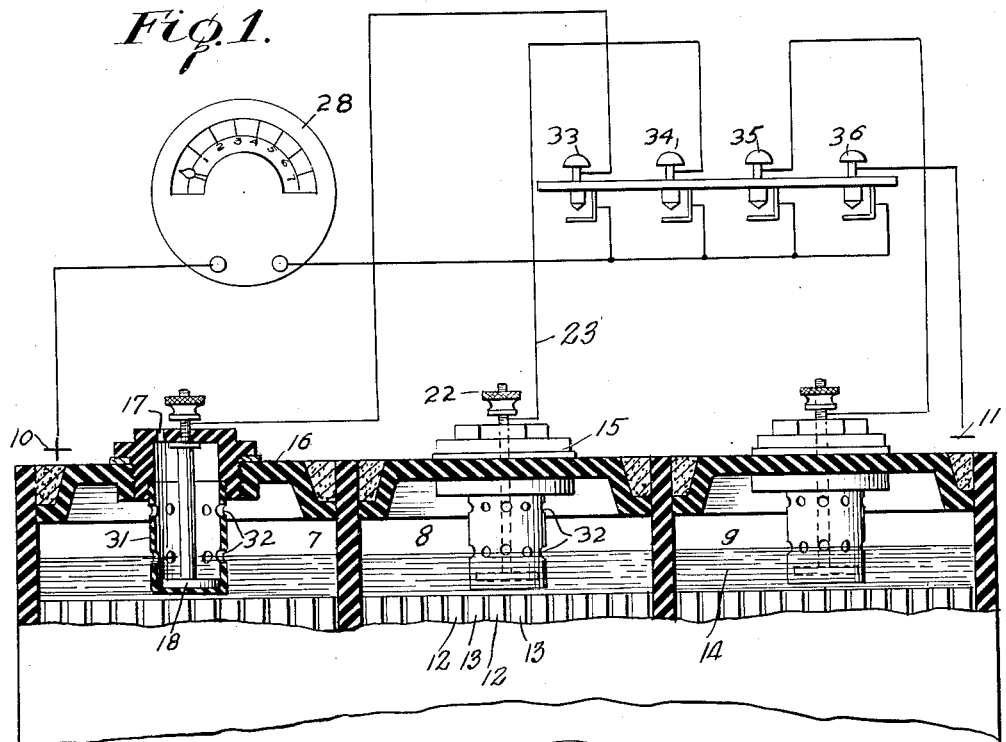
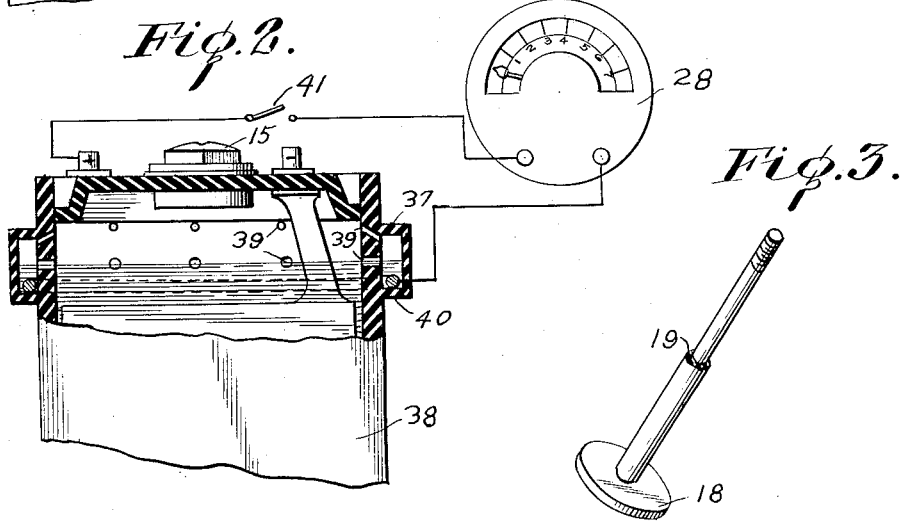
INVENTOR
Hugh W. Turney
BY
Robert A. Lavender
ATTORNEY Patented Sept. 17, 1935

2,014,402

UNITED STATES PATENT OFFICE 2,014,402

ELECTROLYTE LEVEL INDICATOR

Hugh W. Turney, United States Navy

Application April 20, 1932, Serial No. 606,393

10 Claims. (Cl. 136—182)

(Granted under the act of March 3, 1883, as amended April 30, 1928; 370 O. G. 757)

This invention relates to a device for determining whether the level of the electrolyte in a storage battery is up to a desired minimum.

The object of this invention is to provide a simple and rapid means to test each cell of a battery to ascertain whether there is sufficient electrolyte in the cells without the necessity of removing floor boards or other parts that may be over the battery and without taking out the filler caps, and measure the voltage of the battery as a whole.

With the above and other objects in view, the invention consists in the construction, combination and arrangement of parts as will be described more fully hereinafter.

In the drawing:

Fig. 1 is a section through the covers of three cells that have my invention applied thereto;

Fig. 2 shows a modified form of application of the principle of my invention;

Fig. 3 is a detail view of the electrode proper in Fig. 1 with a portion of the insulation on the stem thereof broken away.

Storage batteries on vehicles, boats, aircraft, etc., are usually so located that foot boards or some other part of the body of the conveyance must be removed to gain access to the battery. In addition to removing the aforesaid parts when it is desired to ascertain if the electrolyte needs replenishment, it is necessary to unscrew the filler cap of each cell, and unless there is some means of directing light into the cell it is difficult even then to make sure of the level of the electrolyte. My invention not only provides for a facile, rapid determination whether the electrolyte is up to the minimum level without going through the above mentioned steps, but also makes possible the ready testing of the voltage battery as a whole and of each cell individually.

In any type of lead-acid storage battery a difference of potential exists between either the positive or the negative plates and a conductor in effective contact with the electrolyte. This fact forms the basis of the present invention.

Fig. 1 shows a battery composed of cells 7, 8, and 9 having a positive terminal at 10 and a negative terminal at 11, each cell having positive plates 12 and negative plates 13 immersed in electrolyte 14. There is a filler cap 15 of the usual type in the cover 16 of each cell with a breather vent 17 in each cap. Through each cap is passed an electrode having an exposed metallic portion 18 and an insulating sheath 19 on the shank, the thumb nut 22 screwed on the shank providing a means to secure a wire 23 thereto. The exposed portion 18 of the electrode should be of cadmium or some other metal, that will not contaminate the electrolyte and should be disposed about one-eighth inch above the tops of the plates. The electrode is removable as a unit with the filler cap.

An insulating cup 31 is disposed around the electrode and connected to the cap 15, the wall of the cup having apertures 32 therein whereby free communication between the interior of the cup and the cell is maintained. So long as the electrolyte in the cell is high enough to pass through the apertures the electrode will be electrically connected to the plates, but if the electrolyte level drops below the apertures that connection will be broken and no reading on voltmeter 28 will be had when connected to the electrode in a cell wherein that condition obtains. Push-buttons 33, 34 and 35 are in this instance used to connect the cells 7, 8 and 9, respectively to the voltmeter, and button 36 connects the battery as a whole thereto. The cups 31 insure that the exposed portions 18 of the electrodes will always be immersed in electrolyte and thus is prevented the oxidation that would occur if those portions were exposed to air when the electrolyte is low.

In the embodiment of my invention shown in Fig. 2, a hollow rib 37 on each cell jar 38 forms an enclosed chamber on the outside thereof adjacent the upper edges of the plates extending both above and below the minimum desired level of electrolyte. Apertures 39 place the chamber in communication with the interior of the cell and maintain a conducting path through the electrolyte between the plates and conducting element 40 lying in the electrolyte within rib 37 when the electrolyte is not below the lowermost of the apertures, but the path is broken when the height of the electrolyte is less than that. A switch 41 may be closed to take a reading of voltmeter 28 as in the other forms of the invention.

It will be understood that the above description and accompanying drawing comprehend only the general and preferred embodiment of my invention, and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalty thereon.

I claim:

1. In combination with an electric storage cell adapted to contain an electrolyte, an electrode secured to and extending through the upper portion of said cell to a point below the minimum working level of the electrolyte surface, a perforated insulating member enclosing said electrode, the lowermost perforations in which are substantially at said minimum working level, and means to include said electrode in a circuit comprising an indicating device.

2. In combination with an electric storage cell adapted to contain an electrolyte and having a filler cap, an electrode secured to and extending through said cap to a point below the minimum working level of the electrolyte, and a perforated insulating member enclosing said electrode and secured to said cap, the lowermost perforations in said member being substantially at said minimum working level.

3. In combination with an electric storage cell adapted to contain an electrolyte, an electrode secured to and extending through the upper portion of said cell to a point below the minimum working level of the electrolyte surface and a perforated insulating member enclosing said electrode, the lowermost perforations in which are substantially at said minimum working level.

4. In combination with an electric storage cell adapted to contain an electrolyte and having a filler cap, a single electrode secured to and extending through said cap to a point below the minimum working level of the electrolyte, a perforated insulating member enclosing said electrode and secured to said cap, said member being closed at its inner end and being adapted to retain in said closed end a quantity of electrolyte in contact with said electrode, the lowermost perforation in said member lying at the minimum working level of the electrolyte and means to include said electrode in a circuit comprising an indicating device.

5. In combination, an electric storage cell adapted to contain electrolyte, the jar of said cell having an exterior hollow rib on the upper portion of a side wall thereof, the said wall being perforated to connect the interior of said jar with the space within said rib, the lowermost of said perforations being spaced above the lower wall of said rib and lying substantially at the minimum working level of the electrolyte, a conducting element within said rib having a portion below the lowermost perforation whereby said portion is continuously immersed in electrolyte, and means for including said element in a circuit comprising an indicating device.

6. In combination, an electric storage cell adapted to contain electrolyte, the jar of said cell having a hollow rib on the upper portion of a side wall thereof, the said wall being perforated to the interior of said jar with the space within said rib, the lowermost of said perforations being spaced above the lower wall of said rib and lying substantially at the minimum working level of the electrolyte, and means having a portion below the lowermost perforation whereby said portion is continuously immersed in electrolyte to connect an indicating device to electrolyte within said rib.

7. In combination, an electric storage cell adapted to contain electrolyte, the jar of said cell having an exterior hollow rib on the upper portion of a side wall thereof, the said wall being perforated to connect the interior of said jar with the space within said rib, the lowermost of said perforations being spaced above the lower wall of said rib and lying substantially at the minimum working level of the electrolyte and a conducting element within said rib having a portion below the lowermost perforation whereby said portion is continuously immersed in electrolyte.

8. In combination, an electric storage cell adapted to contain electrolyte, means having a recess adapted to receive and retain a relatively separate body of electrolyte, said recess having communication with the interior of the cell at a point above the lowermost portion of the recess whereby the electrolyte in said portion will be connected to the electrolyte in the cell when that in the cell is at or above the level of said point of communication, the lowermost point of communication lying substantially at the minimum working level of the electrolyte in the cell and a conducting member disposed to form an electrical contact with the electrolyte in said recess, said contact being below the lowermost point of communication continuously immersed in electrolyte in said recess.

9. In combination, an electric storage cell adapted to contain electrolyte, means having a recess to receive and retain a relatively separate body of electrolyte, said recess having communication with the interior of the cell at a point above the lowermost portion of said recess whereby the electrolyte in said portion will be connected to the electrolyte in the cell when that in the cell is at or above the level of said point of communication, the lowermost point of communication lying substantially at the minimum working level of the electrolyte in the cell and means in said portion adapted to form part of a circuit whereof other parts are exterior of said cell, said means having a contact surface continuously immersed in the electrolyte in said portion below the lowermost point of communication.

10. In combination with an electric storage cell having a filler cap, a hollow cylindrical nonmetallic member having its upper end fixed to said cap and perforations through its wall, the lower end of said member being closed and normally disposed below the minimum working level of the electrolyte in said cell, the lowermost perforations in said wall being substantially at said minimum level, and an electrically conducting element extending into said member beyond the said lowermost perforations.

HUGH W. TURNEY.